United States Patent
Clark et al.

(10) Patent No.: US 8,857,851 B2
(45) Date of Patent: Oct. 14, 2014

(54) RESTRAINED SHIFT CABLE BRACKET IN AN ADJUSTABLE STEERING COLUMN

(71) Applicants: Michael W. Clark, Essexville, MI (US); Melvin L. Tinnin, Clio, MI (US)

(72) Inventors: Michael W. Clark, Essexville, MI (US); Melvin L. Tinnin, Clio, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 13/803,116

(22) Filed: Mar. 14, 2013

(65) Prior Publication Data

US 2014/0260750 A1   Sep. 18, 2014

(51) Int. Cl.
*B60K 20/06* (2006.01)
*B62D 1/187* (2006.01)
*B62D 1/19* (2006.01)

(52) U.S. Cl.
CPC ..................................... *B60K 20/06* (2013.01)
USPC ........................................ 280/775; 74/473.31

(58) Field of Classification Search
CPC .......... B62D 1/18; B62D 1/185; B62D 1/187; B62D 1/192; B60K 20/06
USPC .................... 74/493, 473.31, 473.32; 280/775
See application file for complete search history.

(56) References Cited

U.S. PATENT DOCUMENTS

| | | | | |
|---|---|---|---|---|
| 4,805,476 A | * | 2/1989 | Beauch et al. | 74/473.31 |
| 5,954,616 A | * | 9/1999 | Snell et al. | 477/99 |
| 6,327,928 B1 | * | 12/2001 | Bowerman et al. | 74/473.31 |
| 8,065,931 B1 | * | 11/2011 | Marable et al. | 74/493 |
| 2001/0022111 A1 | * | 9/2001 | Ritchie et al. | 74/473.31 |
| 2003/0213673 A1 | * | 11/2003 | Burr et al. | 192/220.2 |
| 2005/0066760 A1 | * | 3/2005 | Takikawa | 74/473.31 |
| 2005/0236252 A1 | * | 10/2005 | Vermeersch et al. | 192/220.2 |
| 2008/0276745 A1 | * | 11/2008 | Jones et al. | 74/473.15 |

* cited by examiner

*Primary Examiner* — Ruth Ilan
(74) *Attorney, Agent, or Firm* — Cantor Colburn LLP

(57) ABSTRACT

An adjustable steering column for a vehicle is provided. The adjustable steering column includes a mounting bracket configured to be secured to an adjacent portion of the vehicle, the mounting bracket including at least one arm having a rake slot. A column jacket is pivotally mounted to the mounting bracket, the column jacket extending along a first axis and pivotable relative to the mounting bracket for adjustment in a rake direction and movable along the first axis for adjustment in a telescope direction. The adjustable steering column also includes a shift assembly having a shift mechanism secured to the column jacket and a shift cable bracket extending from the shift mechanism. The shift cable bracket is supported firstly by the shift mechanism and supported secondly adjacent to the mounting bracket at a distal anchor point.

10 Claims, 1 Drawing Sheet

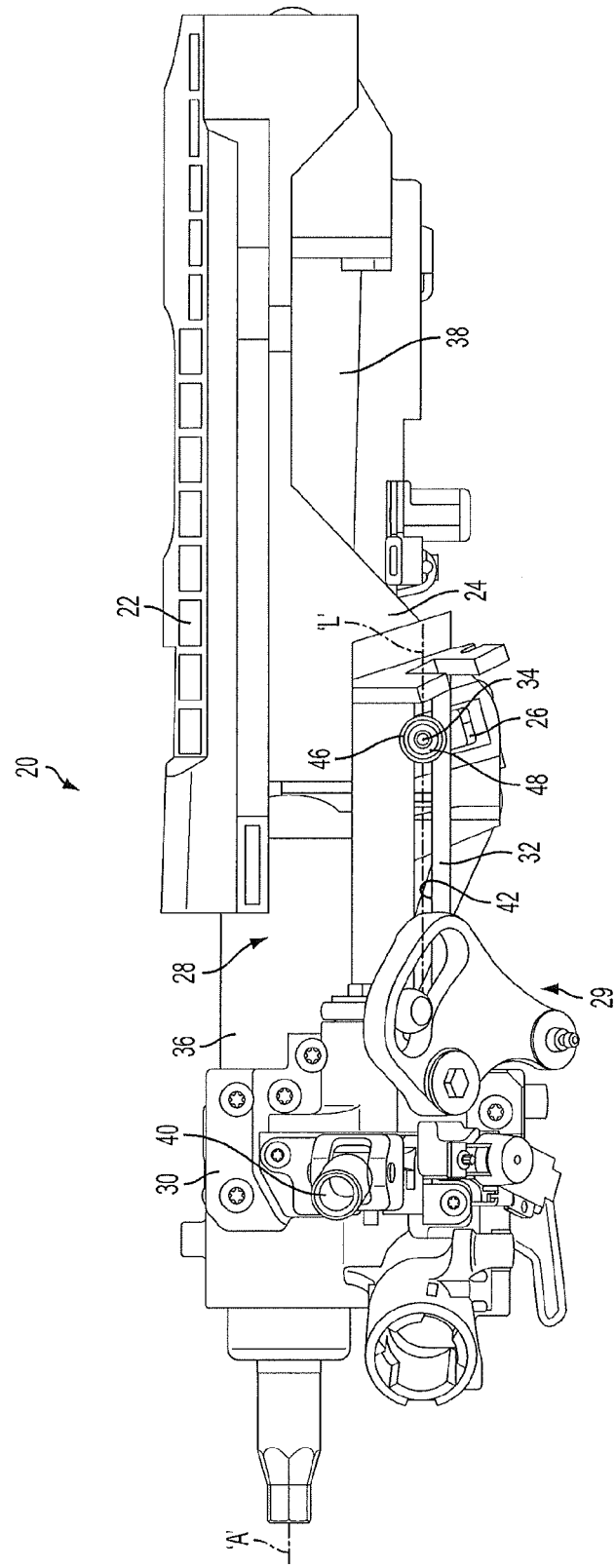

RESTRAINED SHIFT CABLE BRACKET IN AN ADJUSTABLE STEERING COLUMN

BACKGROUND OF THE INVENTION

The following description relates to a shift cable bracket in an adjustable steering column, and in particular, a shift cable bracket extending from a shift mechanism in an adjustable steering column.

A shift mechanism operable to shift gears of a vehicle transmission may be mounted to a steering column. The shift mechanism may include a shift lever that is operable by a vehicle operator to shift gears of the vehicle transmission. The shift mechanism is operably connected to the vehicle transmission by a shift cable. A shift cable bracket may be cantilevered from the shift mechanism. The shift cable bracket acts to restrain a shift cable jacket, in which the shift cable is positioned, near the shift mechanism.

Because the shift cable bracket is cantilevered, i.e., only supported at one end, at the shift mechanism, the shift cable bracket must be made of sufficient strength to restrain the shift cable jacket during movement of the shift cable, for example, when the operator shifts gears of the vehicle transmission via the shift lever. Thus, the shift cable bracket must be made of sufficient thickness so that it is of sufficient strength for this purpose. Because of these requirements, the shift cable bracket may be bulky and/or heavy and require the use of additional material.

Accordingly, it is desirable to provide a shift cable bracket of reduced size and/or weight while maintaining a suitable strength to support the shift cable jacket.

SUMMARY OF THE INVENTION

According to an exemplary embodiment of the present invention, there is provided an adjustable steering column for a vehicle. The adjustable steering column includes a mounting bracket configured to be secured to an adjacent portion of the vehicle, the mounting bracket including at least one arm having a rake slot formed therein. The adjustable steering column further includes a column jacket pivotally mounted to the mounting bracket, the column jacket extending along a first axis and pivotable relative to the mounting bracket for adjustment in a rake direction and movable along the first axis for adjustment in a telescope direction. The adjustable steering column further includes a shift assembly comprising a shift mechanism secured to the column jacket and a shift cable bracket extending from the shift mechanism, the shift cable bracket supported firstly by the shift mechanism and supported secondly adjacent to the mounting bracket at a distal anchor point.

According to another exemplary embodiment of the present invention, there is provided a shift assembly for use with an adjustable steering column in a vehicle, the assembly including a shift mechanism configured to be secured to a column jacket of an adjustable steering column and a shift cable bracket extending from the shift mechanism, the shift cable bracket supported firstly by the shift mechanism and configured to be supported at a distal anchor point spaced from the shift mechanism.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 1 is a perspective view of an adjustable steering column having a shift cable bracket according to an exemplary embodiment of the present invention.

DETAILED DESCRIPTION

Referring now to the Figure, where the invention will be described with reference to specific embodiments, without limiting same, FIG. 1 shows an adjustable steering column assembly 20 according to an exemplary embodiment of the present invention.

The adjustable steering column assembly 20 includes a mounting bracket 22 having at least one arm 24 with a rake slot 26 formed therein, a column jacket 28, and a shift assembly 29 comprising a shift mechanism 30 and a shift cable bracket 32.

The mounting bracket 22 is configured to be secured to an adjacent vehicle component (not shown). In an exemplary embodiment, the mounting bracket 22 includes two arms 24 and the column jacket 28 extends between the two arms 24 along a first axis 'A'.

The column jacket 28 is pivotally coupled to the mounting bracket 22 for adjustment in a rake direction. A rake bolt 34 is coupled to the column jacket 28 and is movable with column jacket 28 during adjustment of the column jacket 28 in the rake direction. The rake bolt 34 extends through the rake slot 26 in the at least one arm 24 and is movable within the rake slot 26 during adjustment in the rake direction. In an exemplary embodiment, the column jacket 28 includes an upper jacket 36 and a lower jacket 38 and is adjustable in a telescope direction along the first axis 'A'. Thus, the adjustable steering column 20 is adjustable in the rake and telescope directions.

The shift mechanism 30 is a column mounted shift mechanism. In an exemplary embodiment, the shift mechanism 30 is secured to the column jacket 28, and in particular, to the upper jacket 36. The shift mechanism 30 includes, for example, a shift lever adapter 40. The shift lever adapter 40 is configured to couple to a gear shift lever (not shown) that may be manipulated by an operator of vehicle to shift a gear of a vehicle transmission. A shift cable (not shown) extends between the shift mechanism 30 and the vehicle transmission (not shown) to affect shifting of a gear of the vehicle transmission in response to movement of the gear shift lever (not shown). The shift cable extends through a shift cable jacket (not shown).

The shift cable bracket 32 extends from the shift mechanism 30. The shift cable bracket 32 is configured to support the shift cable jacket extending between the shift mechanism 30 and the vehicle transmission. The shift cable bracket 32 includes a slot 42. The slot 42 extends along a longitudinal axis 'L' that is generally parallel to the first axis 'A'. The shift cable bracket 32 is connected to and supported firstly by the shift mechanism 30 at a proximate, or first, anchor point, and is supported adjacent to the mounting bracket 22 at a distal, or second, anchor point 46 spaced from the shift mechanism 30 in direction of the longitudinal axis 'L'. In an exemplary embodiment, the shift cable bracket 32 is supported at the second anchor point 46 by the rake bolt 34 and/or a clamping mechanism 48. In addition, the shift cable bracket 32 is movably connected to the mounting bracket 22 at the distal, or second, anchor point 46. The rake bolt 34 extends through the rake slot 26 on the arm 24 of the mounting bracket 22 and the slot 42 on the shift cable bracket 32.

The clamping mechanism 48 is positioned on an end of the rake bolt 34 extending beyond the mounting bracket 22 and shift cable bracket 32. In an exemplary embodiment, the clamping mechanism 48 is configured to move toward or away from the shift cable bracket 32 to apply or release a clamping force to the shift cable bracket 32 in response to movement of the rake bolt 34. In an exemplary embodiment, the clamping mechanism 48 may include an adjustable fastener, such as a threaded fastener, positioned on an end of the rake bolt 34 adjacent to the shift cable bracket 32. In addition, the clamping mechanism 48 may also include at least one washer or spacer positioned between the adjustable fastener and shift cable bracket 32. The washer or spacer may be, for example, a friction disk, spring disk, mechanical spacer, or the like.

It is understood, however, that the clamping mechanism 48 is not limited to configuration described above. For example, the clamping mechanism 48 may be moved from the end of the rake bolt 34 to a position along the rake bolt 34 between the shift cable bracket 32 and an arm 24 of the mounting bracket 22.

The rake bolt 34 is movable in response to rotation of an operating lever (not shown). The operating lever is rotated to actuate the adjustable steering column 20 between a locked condition where adjustment of the steering column 20 in rake and telescope directions is restricted and an unlocked condition where adjustment of the steering column in the rake and telescope directions is permitted. In the locked condition, the clamping mechanism 48 applies the clamping force to the shift cable bracket 32. In the unlocked condition, the clamping force is released from the shift cable bracket 32.

In operation, the adjustable steering column 20 may be adjusted in the rake and telescope directions by rotating an operating lever (not shown) to an unlocked position. Rotation of the operating lever to the unlocked position causes the rake bolt 34 to move, either linearly along its axis, or rotationally, in such way that the clamping force applied by the clamping mechanism 48 is released from the shift cable bracket 32. With the clamping force released, the column jacket 28 may be pivoted relative to the mounting bracket 22 to adjust the steering column 20 in the rake direction. During adjustment in the rake direction, the rake bolt 34 moves within the rake slot 26. The shift mechanism 30 moves together with the column jacket 28 in the rake direction. In addition, the shift cable bracket 32 moves with the shift mechanism 30 and column jacket 28. The shift cable bracket 32 is supported by the rake bolt 36 at the second anchor point 46 in this unlocked condition.

During telescoping adjustment of the steering column 20, the shift mechanism 30 and shift cable bracket 32 move relative to the mounting bracket 22 together with upper jacket 36 along the first axis 'A'. The slot 42 in the shift cable bracket 32 allows the shift cable bracket to move relative to the mounting bracket 22 and rake bolt 34 during telescoping adjustment.

The steering column 20 may be placed in a locked condition by rotating the operating lever to the locked position. In the locked position, the rake bolt 34 moves, for example, in linear direction along its length to bring the clamping mechanism 48 toward the shift cable bracket 32. Thus, the rake bolt 34 moves the clamping mechanism 48 to apply the clamping force to the shift cable bracket 32 and, in turn, the mounting bracket 22. In the locked condition, the clamping force is sufficient to restrict adjustment of the steering column 20 in the rake and telescope directions. In particular, the clamping force is sufficient to restrict relative movement between the shift cable bracket 32 and the mounting bracket 22. Further, there may be a friction force between the shift cable bracket 32 and the arm 24 of the mounting bracket that further resists relative movement.

It is understood, however, that telescoping movement may be permitted in high impact or crash scenarios, where a force is applied to the column jacket with a component along the first axis 'A' that is sufficient to overcome the clamping force applied by the clamping mechanism 48. That is, the steering column 20 may release the clamping force in response to a high impact or crash scenario where a sufficiently large axial force is applied to the column jacket 28 In addition, in the locked condition, the shift cable bracket 32 is supported by the rake bolt 34 and clamping mechanism 48 at the second anchor point 46.

In the exemplary embodiments above, the shift cable bracket 32 is supported at two anchor points, one at the shift mechanism and another at second anchor point 46. Accordingly, an axial and radial stiffness of the shift cable bracket 32 may be increased, while being formed of a thinner gauge than traditional cantilevered shift cable brackets.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An adjustable steering column for a vehicle, the steering column comprising:
    a mounting bracket configured to be secured to an adjacent portion of the vehicle, the mounting bracket including at least one arm having a rake slot formed therein;
    a column jacket pivotally mounted to the mounting bracket, the column jacket extending along a first axis and pivotable relative to the mounting bracket for adjustment in a rake direction and movable along the first axis for adjustment in a telescope direction; and
    a shift assembly comprising:
    a shift mechanism secured to the column jacket; and
    a shift cable bracket extending from the shift mechanism, the shift cable bracket supported firstly by the shift mechanism and supported secondly adjacent to the mounting bracket at a distal anchor point, wherein the shift cable bracket includes a slot extending to the mounting bracket at a distal anchor point.

2. The adjustable steering column of claim 1, further comprising a rake bolt, the rake bolt extending through the rake slot of the mounting bracket and the slot of the shift cable bracket.

3. The adjustable steering column of claim 2, wherein the shift cable bracket is supported adjacent to the mounting bracket at the distal anchor point by the rake bolt.

4. The adjustable steering column of claim 2, further comprising a clamping mechanism positioned on the rake bolt adjacent to the shift cable bracket.

5. The adjustable steering column of claim 4, wherein the clamping mechanism is configured to apply or release a clamping force to the shift cable bracket in response to movement of the rake bolt.

6. The adjustable steering column of claim 4, wherein the shift cable bracket is movably connected to the mounting bracket by the rake bolt and clamping mechanism.

7. The adjustable steering column of claim 2, wherein the shift cable bracket moves relative to the rake bolt during adjustment in a telescope direction.

8. The adjustable steering column of claim 2, wherein the rake bolt moves within the rake slot during adjustment in a rake direction.

9. The adjustable steering column of claim 1, wherein the column jacket includes an upper jacket and a lower jacket, the shift mechanism secured to the upper jacket.

10. A shift assembly for use with an adjustable steering column in a vehicle, the assembly comprising:
- a shift mechanism configured to be secured to a column jacket of an adjustable steering column; and
- a shift cable bracket extending from the shift mechanism, the shift cable bracket supported by the shift mechanism and configured to be supported at a distal anchor point spaced from the shift mechanism, wherein the shift cable bracket includes a slot and the distal anchor point is at a position along the slot.

\* \* \* \* \*